United States Patent
Kustarz et al.

(10) Patent No.: US 9,432,385 B2
(45) Date of Patent: Aug. 30, 2016

(54) SYSTEM AND METHOD FOR DENIAL OF SERVICE ATTACK MITIGATION USING CLOUD SERVICES

(75) Inventors: Chester Kustarz, Ann Arbor, MI (US); Lawrence Bruce Huston, III, Ann Arbor, MI (US); James A. Simpson, Ann Arbor, MI (US); James Edward Winquist, Ypsilanti, MI (US); Olan Patrick Barnes, Canton, MI (US); Eric Jackson, Canton, MI (US)

(73) Assignee: Arbor Networks, Inc., Burlington, MA (US)

( * ) Notice: Subject to any disclaimer, the term of this patent is extended or adjusted under 35 U.S.C. 154(b) by 361 days.

(21) Appl. No.: 13/328,206

(22) Filed: Dec. 16, 2011

(65) Prior Publication Data
US 2013/0055374 A1 Feb. 28, 2013

Related U.S. Application Data

(60) Provisional application No. 61/528,717, filed on Aug. 29, 2011.

(51) Int. Cl.
G06F 11/00 (2006.01)
H04L 29/06 (2006.01)
G06F 21/55 (2013.01)

(52) U.S. Cl.
CPC .......... *H04L 63/1408* (2013.01); *G06F 21/55* (2013.01); *H04L 63/1441* (2013.01); *H04L 63/1458* (2013.01)

(58) Field of Classification Search
CPC H04L 63/1441; H04L 63/1458; G06F 21/55

USPC .......................................................... 726/13
See application file for complete search history.

(56) References Cited

U.S. PATENT DOCUMENTS

| | | | | |
|---|---|---|---|---|
| 6,041,042 | A * | 3/2000 | Bussiere | H04L 12/24 370/245 |
| 7,444,417 | B2 * | 10/2008 | Jayawardena et al. | 709/229 |
| 7,665,135 | B1 * | 2/2010 | Mohiuddin et al. | 726/22 |
| 7,779,465 | B2 | 8/2010 | Baker et al. | |
| 7,904,345 | B2 * | 3/2011 | Dworkin et al. | 709/225 |
| 7,987,493 | B1 * | 7/2011 | Reams et al. | 726/1 |
| 8,006,305 | B2 * | 8/2011 | Aziz | 726/24 |
| 8,346,960 | B2 * | 1/2013 | Spatscheck et al. | 709/238 |

(Continued)

OTHER PUBLICATIONS

Floyd et al., "Pushback Messages for Controlling Aggregates in the Network," Jan. 2001.*

(Continued)

*Primary Examiner* — Andrew Georgandellis
(74) *Attorney, Agent, or Firm* — Locke Lord LLP; Scott D. Wofsy; Christopher J. Capelli

(57) ABSTRACT

A method to mitigate attack by an upstream service provider using cloud mitigation services. An edge detection device, which located at the subscriber's network edge, is able to communicate information via status messages about attacks to an upstream service provider. The service provider is then able to mitigate attacks based on the status messages. There is a feedback loop whereby the amount of dropped traffic by the service provider is added to the network traffic to keep the mitigation request open and prevent flapping. Likewise, the detection device includes time-to-engage and time-to-disengage timers to further prevent flapping.

30 Claims, 6 Drawing Sheets

(56) References Cited

U.S. PATENT DOCUMENTS

| | | |
|---|---|---|
| 2004/0004941 A1 | 1/2004 | Malan et al. |
| 2004/0148520 A1 | 7/2004 | Talpade et al. |
| 2005/0165901 A1 | 7/2005 | Bu et al. |
| 2006/0010389 A1 | 1/2006 | Rooney et al. |
| 2006/0075489 A1* | 4/2006 | Ganguly et al. ............... 726/22 |
| 2008/0271146 A1 | 10/2008 | Rooney et al. |
| 2009/0013404 A1 | 1/2009 | Chow et al. |
| 2010/0082513 A1 | 4/2010 | Liu |
| 2011/0083179 A1 | 4/2011 | Lawson et al. |

OTHER PUBLICATIONS

Wikipedia, "Port Mirroring," Jun. 16, 2004.*
International Search Report and Written Opinion for PCT Application No. PCT/US2012/05166, dated Dec. 12, 2012.

* cited by examiner

SYSTEM AND METHOD FOR DENIAL OF SERVICE ATTACK MITIGATION USING CLOUD SERVICES

RELATED APPLICATIONS

This application claims the benefit under 35 USC 119(e) of U.S. Provisional Application No. 61/528,717, filed on Aug. 29, 2011, which is incorporated herein by reference in its entirety.

BACKGROUND OF THE INVENTION

The Internet is a global public network of interconnected computer networks that utilize a common standard set of communication and configuration protocols. The Internet includes numerous private, public, business, academic, and government networks. Within each of the different networks are devices such as servers, workstations, printers, portable computing devices, host computers, monitoring devices, to name a few examples. These devices are able to connect to devices within their own network or to other devices within different networks through communication devices such as hubs, switches, and routers.

Sometimes an attacker will attempt to disrupt network communications or operation. A common type of attack is a volume based denial-of-service attack (DoS). Typically, the attacker targets a single network, device, group of devices, or link within a network and attacks by generating network traffic. The increased traffic consumes the victim (or target) network's available bandwidth, the computer resources of the victim device, or the resources of the communications devices used to transmit the traffic. The attack impacts the victim's ability to communicate with other legitimate devices or networks because the resources of victim device or network are consumed in an attempt to handle or respond to the attack traffic.

One approach to mitigate the volume based DoS attacks involves a subscriber, typically an enterprise network, signaling an upstream service provider to help mitigate the attack after it was detected at the subscriber's network. In the past, subscribers used out-of-band communications to communicate with the service provider during the attack. Out-of band communications are communications sent via alternate communication channels or mediums than the channel under attack. For example, an information technology (IT) administrator that is tasked with maintaining the victim device or network might use a telephone line or mobile phone network to communicate with administrators working for the upstream service provider.

Another approach is to detect and attempt to mitigate volume based DoS attacks on the service provider side. The advantage with this approach is that the service provider often has the bandwidth to handle the attack traffic and may also have dedicated devices or systems for scrubbing the attack traffic from the legitimate traffic.

Still another approach is for the subscriber to attempt to detect and mitigate the attack at the network edge. This solution, however, is unable to mitigate large attacks because the link to the network is only able to handle a certain amount of traffic. Once this threshold is reached, legitimate traffic will start to be blocked from the subscriber. Moreover, every subscriber that wishes to have mitigation solutions must install and maintain its own hardware and software solutions onsite. Additionally, it is only after an attack has reached the targeted network that the subscriber devices are able to detect and mitigate the attack.

SUMMARY OF THE INVENTION

There are additional problems with these approaches for mitigating DoS attacks. Using out of band communication to the service provider requires human monitoring and intervention to first detect the attack at the subscriber and then communicate the details of the attack to the service provider. On the other hand, detecting and mitigating the attack at the service provider may not provide the sensitivity and specifics required to implement the best mitigation. Since the service provider handles much larger traffic volumes and may not have knowledge of the subscriber's network, the service provider may not be able to detect smaller attacks directed at specific devices or services. Moreover, the service provider may not be well positioned to distinguish between attack and legitimate traffic.

The present invention concerns solution for mitigating DoS attacks that utilizes detection devices preferably located at the subscriber location that signal for a cloud mitigation service, which is managed typically by an upstream service provider, to mitigate the DoS attack.

Moving the mitigation system into a cloud service that is operated by or associated with an upstream service provider allows time sharing of these resources between numerous different subscribers. Moreover, the upstream service provider can be better able to mitigate volume based DoS attacks for subscribers because all of the network traffic must travel through the upstream service provider. Additionally, because the service provider handles mitigation for multiple subscribers, the service provider is able to learn from each attack and better protect its subscribers.

The present invention provides for an edge detection device, which is preferably located at the subscriber's network edge, to communicate information via status messages about attacks to an upstream service provider or cloud mitigation service. In one example, the subscriber and the service provider and possibly even the mitigation services are operated by different business entities; the cloud mitigation is offered as a service to the subscribers. The service provider is then able to mitigate DoS attacks based on the status messages. There is preferably a feedback loop whereby the amount of dropped traffic by the service provider is communicated to the edge detection device so that it knows whether to keep the mitigation request open, thereby preventing flapping. Likewise, the system includes time-to-engage and time-to-disengage timers to further prevent flapping.

In general, according to one aspect, the invention features a method for mitigating an attack on a network utilizing a subscriber monitoring device and a service provider mitigation system. The method includes the subscriber monitoring device monitoring network traffic between a subscriber network and a service provider network and the subscriber monitoring device and service provider mitigation system sending and receiving status messages about network traffic levels to each other. The method further includes the subscriber monitoring device determining if the enterprise network is under attack, the subscriber monitoring device requesting mitigation from the service provider mitigation system when the subscriber network is under attack, the service provider mitigation system dropping packets generated by attackers while the subscriber network is under attack in response to the requested mitigation, and the subscriber monitoring device sending a request to terminate the mitigation in response to status messages from the subscriber protection device.

In general, according to another aspect, the invention features a system for mitigating an attack on a network. The system includes a subscriber monitoring device monitoring network traffic between a subscriber network and a service provider network. The subscriber monitoring device and a service provider mitigation system sending and receiving status messages to each other. The system further includes the subscriber monitoring device determining if the subscriber network is under attack, the subscriber monitoring device requesting mitigation from the service provider mitigation system when the subscriber network is under attack, the service provider mitigation system dropping packets generated by attackers while the subscriber network is under attack in response to the requested mitigation, and the subscriber monitoring device sending a request to terminate the mitigation in response to status messages from the subscriber protection device.

In general, according to another aspect, the invention features a system for mitigating an attack on a network. The system includes a subscriber monitoring device monitoring network traffic between a subscriber network and a service provider network. The system further includes the service provider monitoring system for monitoring network traffic within the service provider network, wherein the subscriber monitoring system and the service provider monitoring system send and receive status messages to each other using a stateless communication protocol such as the User Datagram Protocol (UDP) of the Internet protocol suite.

In general, according to another aspect, the invention features a method for communicating between a subscriber monitoring device monitoring network traffic between a subscriber network and a service provider network and a service provider monitoring system for monitoring network traffic within the service provider network. The method includes the subscriber monitoring device and service provider monitoring system sending and receiving status messages to each other. The method further includes the subscriber monitoring device and the service provider mitigation system recording arrival times of the status messages and adding the arrival times and a timestamp to the subsequent status messages between the service provider monitoring system and the subscriber monitoring device.

In general, according to another aspect, the invention features a networking system, comprising a subscriber monitoring device monitoring network traffic between a subscriber network and a service provider network and determining if the subscriber network is under attack and a mitigation system including a scrubbing system for dropping packets that are part of a denial of service attack. The mitigation system, in response to the subscriber monitoring system signaling an attack, directs traffic destined for the subscriber network first to the scrubbing center and then back to the subscriber network.

In embodiments, techniques such as tunneling, route injection, Domain Name System modification, and Network Address Translation are used.

In general, according to another aspect, the invention features networking system comprising a subscriber monitoring device monitoring network traffic between a subscriber network and a service provider network and determining if the subscriber network is under attack and a fingerprint for the attack. A mitigation system includes a scrubbing system for dropping packets that are part of a denial of service attack based on the fingerprint provided by the subscriber monitoring device.

In embodiments, techniques the fingerprint includes the source IP addresses and/or source and destination IP address combinations of the packets that make up the attack.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
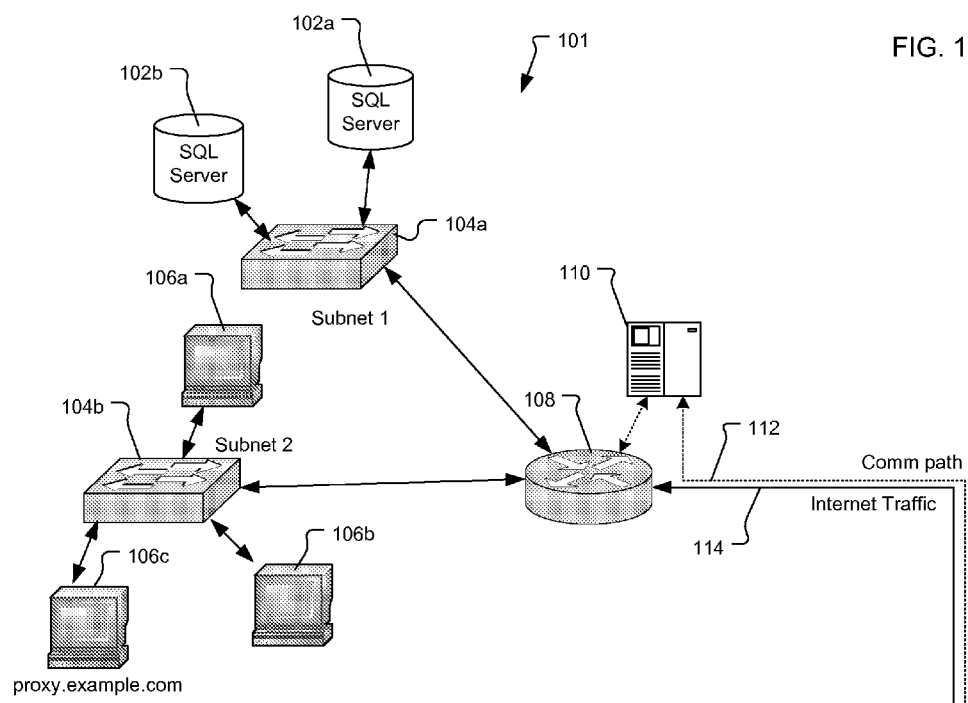
FIG. 1 is a schematic diagram showing a network architecture and the relationship between the internet, service provider, scrubbing center, edge detection device, and subscriber network according to one embodiment of the present invention.
Figure 1:
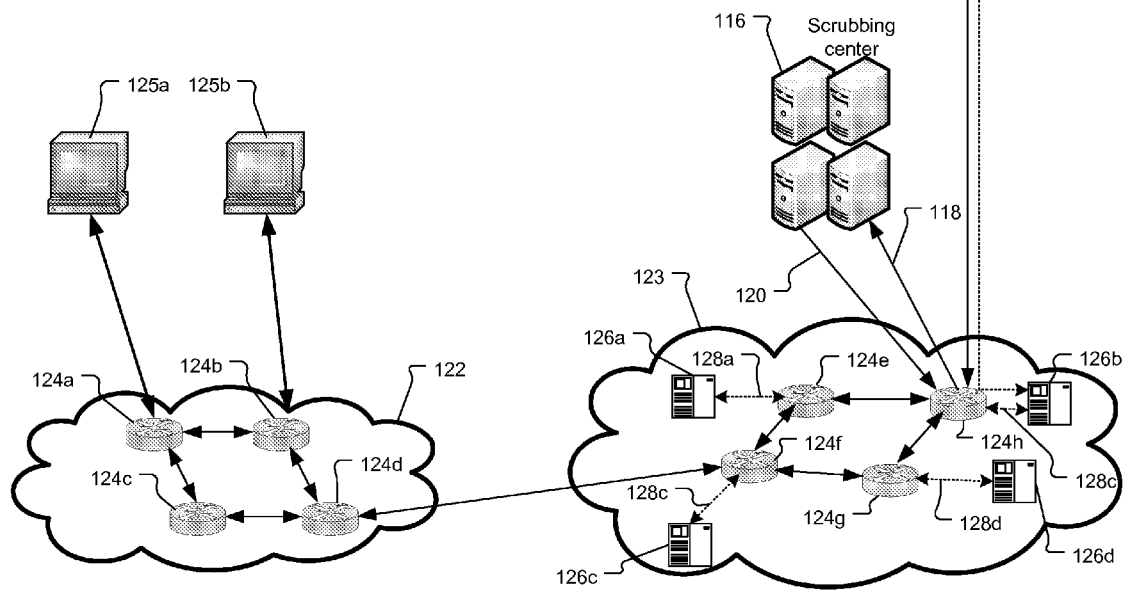
Figure 2:
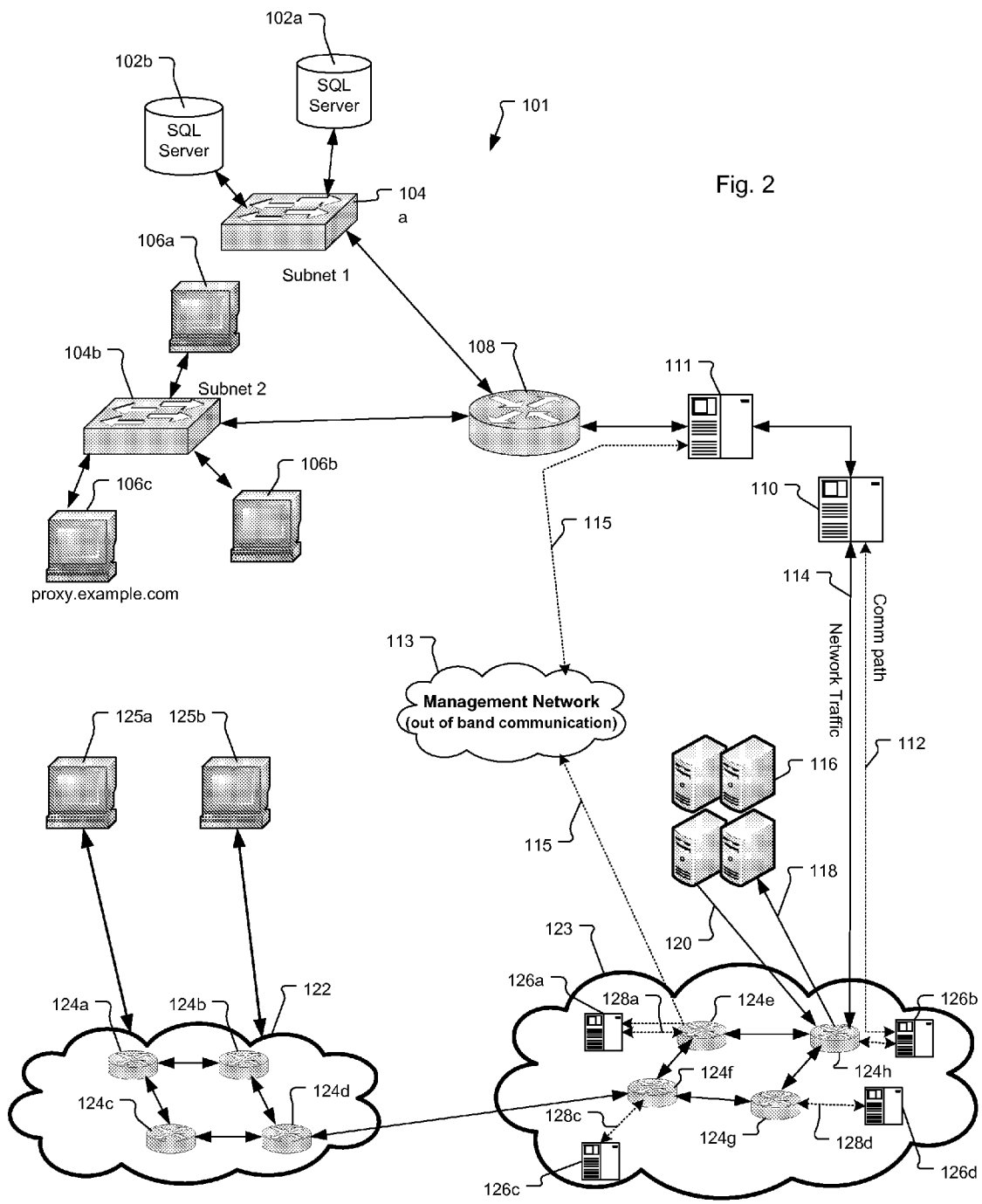
FIG. 2 is a schematic diagram showing another network architecture and the relationship between the internet, service provider, edge detection device, edge mitigation device and scrubbing center, using an out-of-band communication channel, according to another embodiment implementation of the present invention.
Figure 3:
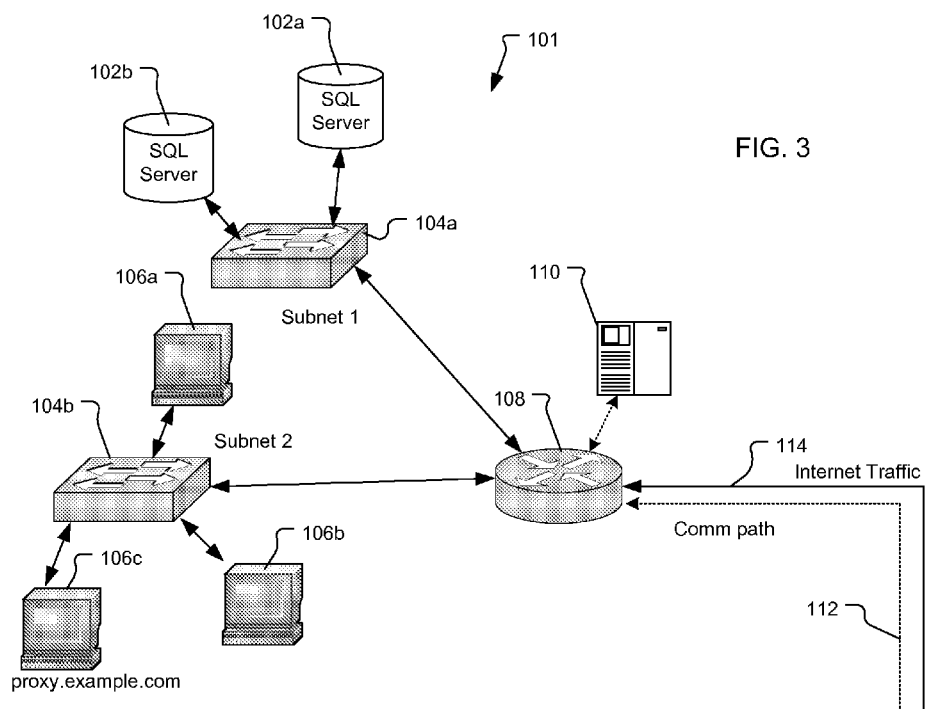
FIG. 3 is a schematic diagram illustrating an alternative embodiment of the network architecture where the scrubbing center capability is provided by a third party service provider.
Figure 3:
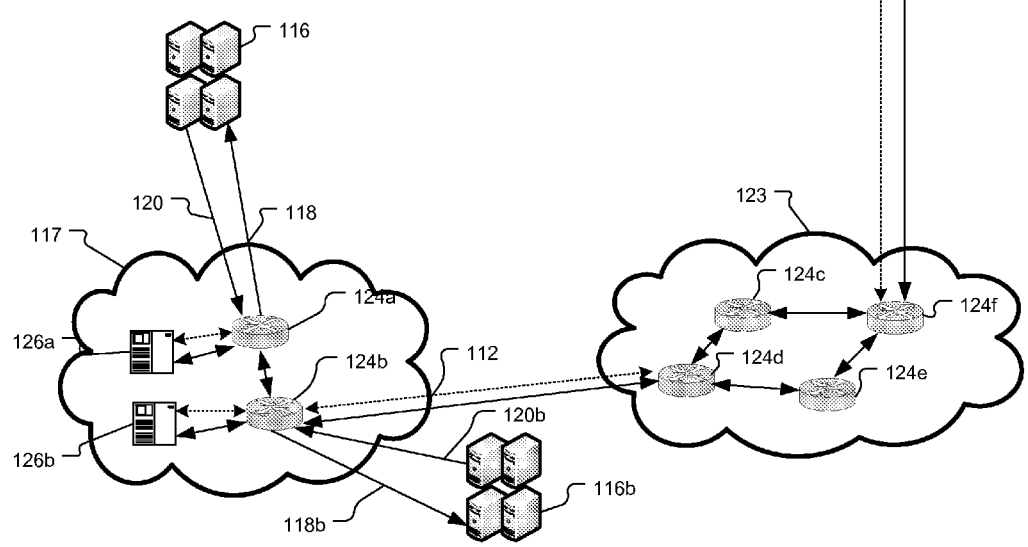

FIGS. 1-3 show different network architectures to which the present invention is applicable. Each shows the relationship between the internet 122, service provider network 123, scrubbing center 116, edge detection device 110, and subscriber network 101.

In FIG. 1 one or more external devices 125*a*, 125*b* attempt to connect to the subscriber network 101 and specifically a device within the network 101. In the illustrated example, the external devices 125*a*, 125*b* connect via the Internet 122, which is comprised of third-party communication devices (numerals 124*a-d*), such as the communications devices of an enterprise network and/or other public and private service provider networks.

Connecting the subscriber network 101 to the internet 122 is a service provider network 123 (service provider). The service provider network has a service provider mitigating system that includes a packet scrubbing system such as a scrubbing center 116 and sensors 126a-d Communication devices 124e-h provide the data communication and specifically transmit packets across the network 123. In the illustrated example, the service provider network 123 is also an internet service provider (ISP) for the subscriber network 101.

While only a single service provider and scrubbing center are shown in FIG. 1, in other implementations, the service provider mitigation system includes multiple scrubbing centers in different locations on its network or contracts with third parties that provide scrubbing as a service.

In one example, the multiple sensors 126a-d are connected to or associated with communications devices 124e-h, such as routers, of the service provider network 123. The sensors 126 communicate with their associated communication devices 124 via communication paths 128a-d to monitor the network traffic handled by the routers 124. In one example, the sensors 126a-d monitor total traffic levels, IP address destinations and/or origins, bitrates, and browsers being used, to list a few examples, and are used by the service provider to implement security policies across its network 123. Here, the sensors 126 are further used to deploy network resources for mitigating denial of service attacks to protect the subscriber network 101 and its subscribers.

The service provider network 123 further provides access to the scrubbing center 116. The scrubbing center 116 is a device (or group of devices) within or accessible from the service provider network 123 that is able to distinguish and then separate the legitimate traffic from attack traffic. The scrubbing center 116 receives off-ramped traffic through a communication channel 118, removes the detected attack traffic, the legitimate traffic is then returned through a communication channel 120. In some examples, the scrubbing center removes or drops packets from specified source IP addresses, packets with specified source and specified destination IP addresses, packets with specified payloads, and/or packets for specified ports.

In the illustrated example, the scrubbing center 116 is connected to a router 124h located at the peering edge of the service provider. However, the scrubbing center 116 is generally within the cloud and is capable of connecting to any of the communication devices 124e-g of the service provider in many implementations.

The service provider network 123 connects to a subscriber communications device 108, typically a router, of the subscriber network 101 through a network connection or link 114. Additionally, the router 108 also interconnects the subnetworks (i.e., subnet 1, subnet 2) defined by switches 104a, 104b in the case of an enterprise network for example. Subnetworks (or subnets) are subdivisions within the larger subscriber network 101. In the illustrated example, subnet 1 includes a switch 104a and SQL servers 102a, 102b. Subnet 2 includes a switch 104b and computer workstations 106a, 106b.

In the illustrated implementation, the edge detection device or subscriber monitoring device 110 is connected to the router 108 and uses port mirroring (also known as switched port analyzer (SPAN) port) to monitor all the network traffic entering and/or leaving the subscriber network 101 via the router 108. When port mirroring is enabled, the router 108 sends copies of the traffic on configured ports of the router to a specified port, which is monitored by the edge detection device 110.

Generally, the management interface(s) for the edge detection device 110 resides inside the intranet or subscriber network 101 such as on host 106c. Any HTTP or HTTPS traffic initiated by the edge detection device 110 uses "proxy.example.com" to make connections from one of the management interfaces to the service provider 123 and specifically sensor 126b, for example. The service provider network 123 sees these connections as originating from the IP address of "proxy.example.com".

Also connecting the edge detection device 110 with the sensor 126b is a logical communication path 112. Packets transmitted over this communication path 112 are transmitted with the packets of the network connection 114 in this embodiment. In this way, the communications path 112 is in-band with the other communications between the subscriber network 101 and the service provider network. The communications path 112 transmits status messages that contain status information and reporting of ongoing mitigation between the upstream cloud mitigation system implemented in the service provider network 123.

The status messages preferably utilize a stateless communication protocol such as the User Datagram Protocol (UDP) of the Internet protocol suite. A stateless messaging protocol is utilized because it does not require a handshaking. That is, the transmission of messages from one device to another is not dependent on receiving messages from other device or receiving confirmation that sent messages were successfully received by the other device.

In a preferred embodiment, the status messages provide confirmation that mitigation has been started in the cloud. The purpose of the messages is to be minimally operational and allow subscribers to obtain benefits of both on-premise and in-the-cloud protection.

FIG. 2 shows an alternative architecture to which the present invention is applicable. Here, an edge mitigation device 111 is installed on the network connection 114 and is used to protect the subscriber network 101 from smaller attacks. Further, the edge detection device 110 is placed in-line, in this example, and located between the service provider network 123 and subscriber network 101. With this configuration, the edge detection device 110 detects attacks and signals the edge mitigation device to handle low bandwidth threats targeted at the subscriber network 101 that do not require the service provider mitigation system (or upstream cloud mitigation system). However, when the size of the attacks exceeds the capabilities of the edge mitigation device 111 or the bandwidth of the network connection 114, then the edge detection device 110 engages the service provider mitigation system.

In an alternative embodiment, the service provider mitigation is engaged before edge mitigation device 110 and edge mitigation system 111 are overwhelmed. That is, the threshold for when to engage the service provider 123 is set to a predetermined level when the link that is close to saturation rather than fully saturated.

Additionally, the service provider 123 often provisions a bandwidth cap for the network connection 114. In some embodiments the bandwidth cap is smaller than the actual bandwidth capacity of the network connection 114. By way of example, the network connection 114 might be a 10 Gps Ethernet link, but the bandwidth cap is set to 10 Mbps by the service provider 123. Thus, when traffic exceeds that 10 Mbps cap, the edge detection device 110 requests mitigation even though the link could handle more network traffic.

This alternative embodiment further includes a management network 113 that provides an out-of-band communication path. The alternative communication path 115 that is separate from the network traffic transported on network connection 114. Using a separate communication path ensures that the subscriber network 101 and service provider mitigation system are still able to communicate when the in-band communication path 112 is unavailable. Examples of alternative communication paths include a land line telephone network, mobile phone network, wireless data network, or a redundant and independent internet connection. Generally, these alternative out-of-band communication paths will not be affected by the internet traffic on the network connection or link 114.

In yet another alternative embodiments, the scrubbing center 116 is provided by third party providers and may not even be directly connected to the service provider's network 123 (see FIG. 3). In this embodiment, after mitigation is requested, network traffic is redirected from the subscriber network 101 by the service provider 123 by adjusting global routing information for example. The traffic is sent to mitigation provider network 117 where it is scrubbed by the scrubbing centers 116 then injected back the subscriber network 101 using tunneling protocols.

In another embodiment, the subscriber utilizes two service providers for redundancy. The edge detection device 110 is preferably capable of supporting multiple upstream providers. Typically, there are two variants: both active and failover. With both active, both service providers are used and during an attack some traffic is routed to one provider and other traffic is routed to the other. Likewise, the routes can be asymmetric, whereby communication to a client can be received via a first service provider and sent to the second service provider. With failover, the second service provider becomes active when the first service provider fails.

When utilizing a third party mitigation provider (i.e., when the ISP network 123 is not the mitigation service provider network 117) the mitigation service provider 117 is generally not able to monitor the traffic of the subscriber network 101. This is because the mitigation service provider 117 is not directly upstream of the subscriber network 101. Thus, the mitigation service provider 117 must wait for the edge detection device 110 to request mitigation.

Once mitigation has been requested, the mitigation service provider 117 adjusts the global routing information such as in the service provider network 123 to redirect the traffic destined for the subscriber network 101 to the mitigation service provider 117.

The mitigation service provider 117 utilizes multiple scrubbing centers 116, 116b in some examples. The use of multiple scrubbing centers provides redundancy and enables the mitigation service provider 117 to be able to mitigate multiple attacks and/or larger attacks. If multiple scrubbing centers are used, then additional communication channels 118b, 120b are used to route the traffic to and from the scrubbing centers. As before in the other embodiments, the mitigation system sensors 126a,126b communicate with an associated communication devices 124a,124b to monitor and direct the network traffic handled by the devices. The sensor direct the traffic to be scrubbed and direct the scrubbed traffic back through the mitigation service provider network 117 and the internet service provider network 123.

There are different methods to redirect the traffic to the scrubbing center 116. A first method for redirecting traffic is via route injection. The route injection is accomplished by modifying the routes using Border Gateway Protocol (BGP). In more detail, when the edge detection device 110 requests mitigation, the service provider 123 adjusts global routing information by causing the device or network being targeted to un-announce their route. Then the service provider 123 announces a new route for the target device that directs all the traffic to the scrubbing center 116 of the service provider.

A second method to redirect the traffic is to change the DNS (Domain Name System) entry of the device or network being attacked to the IP address of the scrubbing center 116. By way of example, if the edge detection device 110 determines that the computers/IP addresses hosting www.example.com are under attack within the subscriber network 101, it requests mitigation from the internet service provider network 123 or mitigation provider network 117, depending on the implementation. If www.example.com has a DNS mapping to IP address 1.1.1.1., then the service provide 123 change the DNS entry of www.example.com to the IP address of the scrubbing center 116 (e.g., IP address 2.2.2.2). All traffic destined for www.example.com is thereby redirected to the scrubbing center 116.

A potential problem with redirecting traffic is that it can be difficult to redirect the scrubbed traffic back to the original destination. This is because the cleaned traffic will otherwise follow the modified routes back to the scrubbing center.

This problem is often solved by tunneling the clean traffic back to the subscriber network 101 with GRE (Generic Routing Encapsulation), MPLS (Multiprotocol Label Switching), or other known tunneling protocols. Generally, these methods require manually pre-provisioning tunnels at both the scrubbing center 116 and at subscriber network 101, and through the subscriber network 123. These methods are often labor intensive and error prone. Likewise, some access routers do not support tunneling.

If the traffic was redirected by changing the DNS, tunneling is performed in one example, but there an additional problem is created because traffic will arrive with the destination IP address of 2.2.2.2 and not the expected IP address of 1.1.1.1. Therefore, if the traffic was destined directly for web servers on the subscriber's network, for example, the web servers need additional configuration to enable them to respond to the expected address and modified address.

Another method to inject (or tunnel) the traffic back to the subscriber network is to perform Network Address Translation (NAT) at the scrubbing center 116. NAT is the process of modifying IP address information in packet headers as the packets travel through a routing device. The problem with this approach is there is no way to distinguish between legitimate traffic that has already been scrubbed and attack traffic.

In a preferred embodiment, cloud signaling messages are sent between the devices. The cloud signaling messages are able to carry information needed to create the tunnel. This reduces the amount of labor and errors associated with setting up the tunnels. Typically, the information in the messages includes the IP addresses of the tunnel endpoints and what protocol to use to set up the tunnel. Therefore, when mitigation is requested by the subscriber network 101, a tunnel is automatically created (using the included information) to send the scrubbed traffic back to the subscriber edge without requiring additional manual configuration.

Additionally, if DNS redirection is used, then the cloud signaling messages carry information about the expected (or original) IP address and modified IP addresses. After the mitigation has been completed, the edge detection device 110 is able to perform the NAT to enable incoming (scrubbed) packets to have the correct destination IP address. The result is there is no need for additional configuration on customer web servers.

Figure 4:
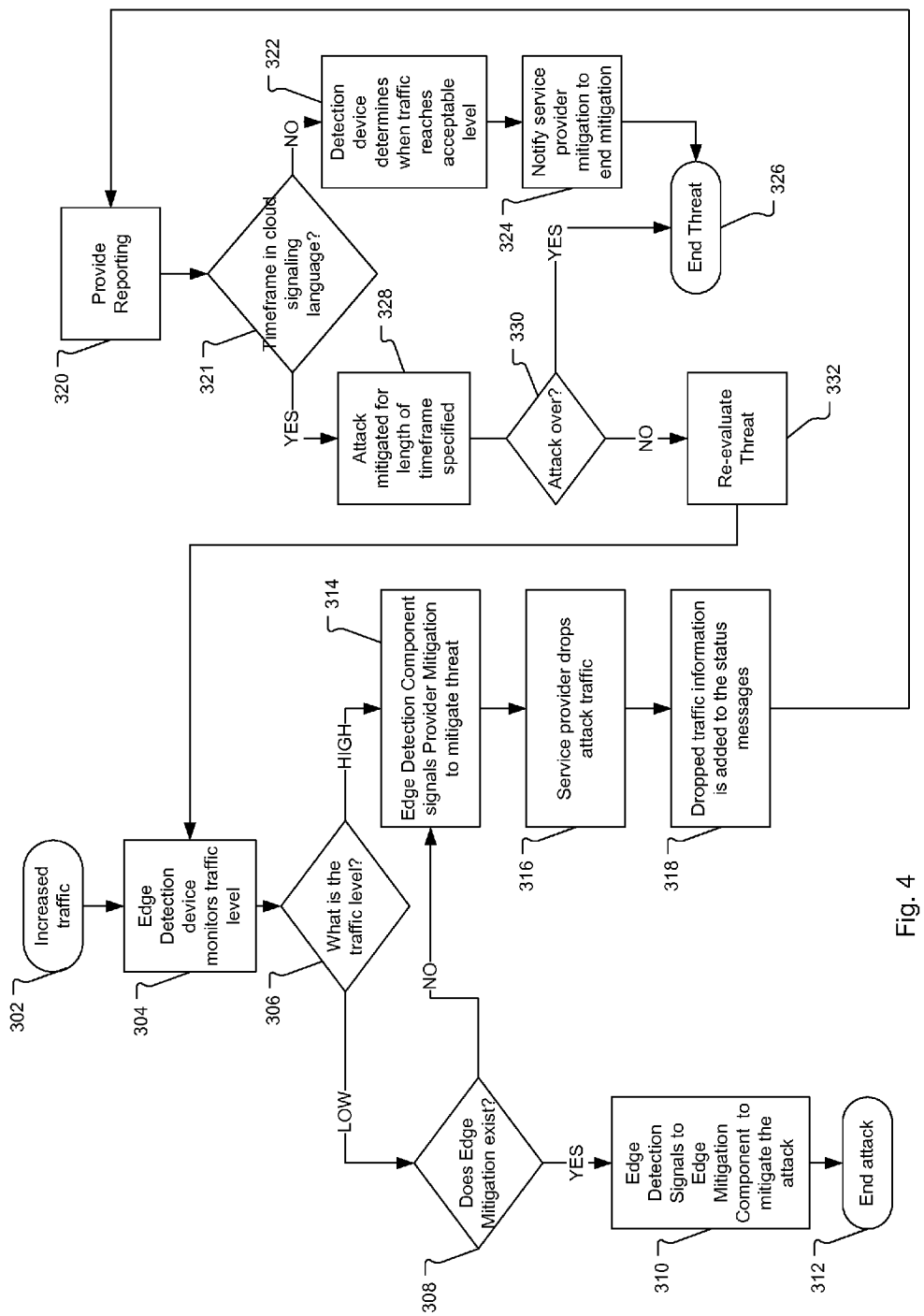
FIG. 4 is a flow diagram illustrating the steps performed by the edge detection device and cloud mitigation service during an attack.

FIG. 4 is a flow chart illustrating the steps performed during an attack. In the first step 302, increased network traffic from external devices 125a, 125b begins arriving at the enterprise or subscriber network 101. The edge detection device 110, which is utilizing port mirroring or connected in-line on the network connection 114, monitors the traffic entering the enterprise network 101 in step 304.

A bits per second (bps) threshold is configured in the edge detection device 110 to automatically request mitigation assistance from the service provider mitigation system of the service provider network 123 when the traffic level exceeds the configured threshold, in one example. Typically, the triggers are based on a combination of known link rate, traffic rates, or the edge detection device's own performance limitations. Additionally, the edge detection system 110 and service provider mitigation system are designed to operate under extreme duress, therefore the edge detection device and service provider should be resilient to attempts to force the subscriber network to request cloud mitigation.

In one implementation, the edge detection device 110 does not analyze the network traffic to determine whether the traffic is legitimate or attack traffic. The trigger is based only on the amount of network traffic. Additionally, an operator is able to engage or disengage the cloud mitigation requests manually through the user interface of the edge detection device 110.

In the preferred embodiment, the edge detection device 110 does not immediately respond to spikes or short periods of increased network traffic. The edge detection device 110 includes a time-to-engage timer of approximately 5 minutes to ensure that the increase in network traffic is a prolonged period of increased network traffic indicative of an attack.

In the next step 306, the edge detection device 110 determines whether the increase in network traffic is "low" or "high" based on predetermined threshold levels. If the network traffic increase is "low", then the edge detection device 110 determines if edge mitigation exists in step 308. If edge mitigation exists, then the edge detection device 110 signals the edge mitigation device 111 to mitigate the threat in step 310. The edge mitigation device 111 then mitigates the attack by dropping packets associated with the attack until the attack ends in step 312.

If the traffic level is "high" or edge mitigation does not exist (from step 308), then the edge detection device 110 signals the service provider network 123 or mitigation provider network 117 to mitigate attack in step 314. The request is sent in a status message that is transmitted through the communications channel 112 to one of the sensors 126 located in the network 117 or 123 of the service providers. In the alternative embodiments that utilizes a management network 113, the status messages are sent via communication path 115. Additionally, it is possible that service provider network 123 is already mitigating an attack. If so, then the request will be to continue mitigating.

In one example, the messages to the sensors 126 from the edge detection device 110 further include details describing the attack, the attack fingerprint. In one example, the messages include the source IP addresses, source and destination IP address combinations of the packets that make up the attack. In other example, the edge detection device 110 specifies the characteristics of the packet payloads and/or specified ports that are part of the attack.

In examples, the messages to the sensor 126 further include internet protocol addresses of a cloud scrubbing center to be used for scrubbing and the internet protocol address of the edge detection device 110. Also when DNS changes are utilized to redirect the attack traffic, the message includes an expected internet protocol address to which attacked device will be changed within the subscriber network 101.

During an attack, the traffic volume is directed at the subscriber network 101. As a result, communication channels designated for outgoing communications are typically still available. Thus, the edge detection device 110 is generally still able to communicate outgoing messages during an attack. If, however, all channels are unavailable, then an alternative out-of-band communication channel may be required to request mitigation from the service provider network 123.

After receiving the request for mitigation, the sensor 126 of the service provider network 123 signals its associated router 124 to redirect the traffic destined for the subscriber network 101 to the scrubbing center 116, which includes transmission of the traffic to the mitigation provider's network 117 in some embodiments. The scrubbing center 116 then filters out and drops packets of the attack traffic in step 316. In one example, the packets dropped by the scrubbing center 116 are those packets specified by the edge detection device 110, with the message from the edge detection device 110 being passed onto the scrubbing center 116.

In the next step 318, information about the amount of dropped traffic is included in status messages sent by the sensor 126 to the edge detection device 110 as part of a feedback loop over path 112. The edge detection device 110 calculates a total amount of traffic targeted at the subscriber network 101 based on the amount of dropped traffic and the amount of network traffic currently being received on the network connection 114. Calculating the total amount of network traffic is done to prevent flapping caused by stopping mitigation before the attack has ended. Flapping is caused when the edge detection device 110 continually requests and cancels mitigation from the service provider network 123.

By way of example, if an attack were launched, the edge detection device 110 would see an increase in network traffic and request mitigation from the service provider. Because all the traffic would then be routed to the scrubbing center 116 where the attack traffic is dropped, the edge detection device 110 would then see a drop in network traffic and the traffic levels would to appear to be normal. The edge detection device 110 would then signal the service provider to stop mitigation. All the network traffic, including attack traffic, would once again be directed back to the subscriber network and the cycle of requesting and cancelling mitigation would continue.

By combining the dropped traffic information included in the status messages from the sensor 126 with the traffic entering the subscriber network 101, the edge detection device 110 is able to request an end to the mitigation only after the attack has stopped or is at a level that can be handled by any resources available on the subscriber network. Additionally, in a typical implementation, a ten minute time-to-disengage timer adds additional security against flapping because the edge detection device 110 does not request the service provider network 123 to end mitigation until the total traffic ((received traffic)+(attack traffic removed by scrubbing center)) is below threshold applied by the edge detection device 110.

In the next step 320, the sensor 126 of the service provider network 123 sends the status message to the edge detection device 110. In the next step 321, the edge detection device determines if a timeframe is included in the cloud signaling message. The timeframe is a predefined length of time that determines how long the service provider should mitigate an attack. If no timeframe is provided, then the edge detection device 110 determines when the network traffic has returned to an acceptable level in step 322. In the next step 324, the edge detection device 110 signals the service provider network 123 to end mitigation. And the threat is ended in step 326.

If a timeframe is provided in the cloud signaling message, then the service provider network 123 and scrubbing center 116 will mitigate the threat for the length of time specified in step 328. In the next step 330, the service provider 123 determines whether the attack has ended. If the attack is over, then the threat is deemed to be over in step 326. If the attack is not over, then the edge detection device 110 re-evaluates the threat in step 332 by returning to step 304 to continue monitoring traffic levels.

The operation of the cloud signaling message and edge detection device is better understood with an example.

During the installation of an edge detection devices 110, cloud signaling is configured. Configuring includes enabling a threshold for automatic signaling, and setting a threshold limit such as 5 Megabits per second (Mbps). In this example, the subscriber's network connection 114 has a bandwidth of 10 Mbps.

If an attack of 20 Mbps is directed at the subscriber network 101, the edge detection device 110 detects the attack as being 10 Mbps, which is entire capacity of the network connection 114). The edge detection device 110 automatically signals a request for mitigation because 10 Mbps is larger than the 5 Mbps threshold. Additionally, in some embodiments, the attack fingerprint is also sent. This is done by adding the request and fingerprint to the next status message sent by the edge detection device 110 to the sensor 126 of the service provider network 123 with a message such as "cloud signaling requested at <date/time> for 10 Mbps attack." The edge detection device is only able to detect an attack up the limit of the network connection 114.

Based on the request, the service provider network begins mitigation on the full 20 Mbps attack. This is because the service provider has more bandwidth capacity and is able to see the entire attack. In one example, router 124*h* is controlled by sensor 126*b* to send the traffic destined for the subscriber network 101 to the scrubbing center 116, possibly via the mitigation provider network 117.

In the status message sent to edge detection device 110, the sensor 126 of the service provider network 123 includes information that the mitigation has started and that 18 Mbps of attack traffic is being mitigated (for example). As a result, even though the edge detection device 110 is currently receiving 2 Mbps in traffic, the edge detection device 110 calculates that 20 Mbps of network traffic is still being directed at the subscriber network 101. Thus, the edge detection device 110 continues to request mitigation from the service provider network 123. Once the total amount of traffic returns to levels under the 5 Mbps threshold, the edge detection device 110 requests that mitigation be terminated after waiting for 10 minutes (time-to-disengage) to ensure the attack has ended and to prevent flapping.

Figure 5:
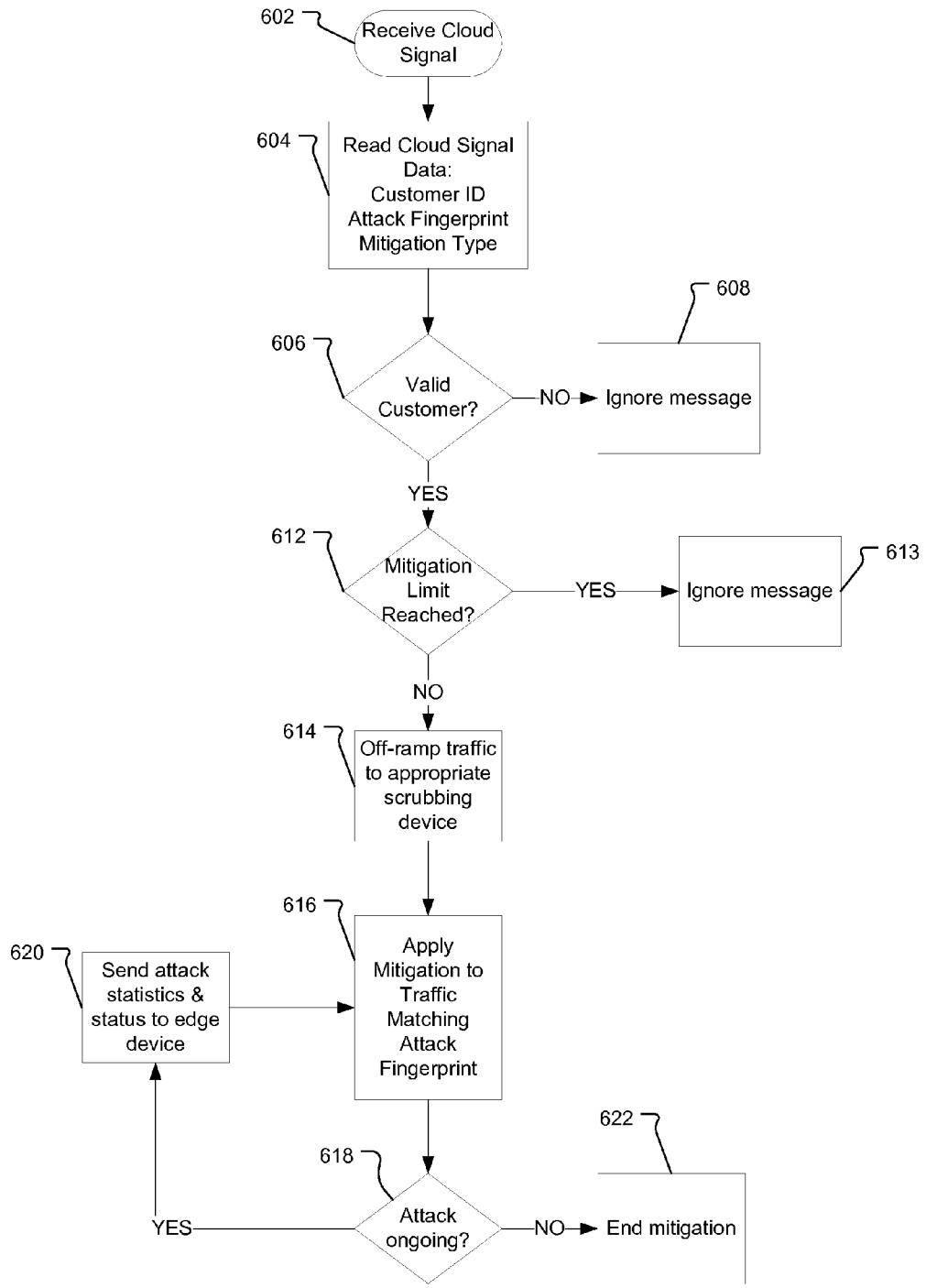
FIG. 5 is a flow diagram showing the steps performed by the cloud mitigation service provider after receiving a status message.

FIG. 5 is flow chart illustrating the steps performed by the service provider mitigation system of the service provider network 123 after receiving a request to mitigate an attack.

In the first step 602, the service provider network 123 receives a status message requesting mitigation from a customer at a sensor 126. The status message is analyzed by the service provider 123 in step 604 to determine the customer ID, the attack fingerprint, and mitigation type.

In the next step 606, the sensor 126 of the service provider network 123 determines if the status message originated from a valid customer. If the status message did not originate from a valid customer then the request is ignored (e.g. dropped) in step 608. The request is dropped to ensure that the service provider 123 does not waste resources responding to a spoofed message.

If the customer is a valid customer, then the service provider 123 determines if the mitigation limit is reached in step 612. If the mitigation limit is reached, then the service step 613. If the mitigation limit has not been reached, then sensor 126 of the service provider network 123 signals the router 124 to redirect the traffic to the scrubbing center 116 in step 614.

In the next step 616, the scrubbing center 116 applies mitigation to the traffic matching attack fingerprint that was communicated from the sensor 126. In the next step 618, the scrubbing center 116 continues to mitigate the attack until another status message arrives requesting the service provider 123 to stop mitigation. While the attack is ongoing, the service provider network 123 or mitigation provider network 117 continue to send attack information and statistics in status messages to the edge detection device 110 in step 620. Once the attack has ended the service provider 123 ends mitigation in step 622.

In the preferred embodiment, status messages are sent between the edge detection device 110 and sensors 126 of the service provider network 123 or mitigation provider network 117 every minute regardless of whether the subscriber network 101 is under attack or the service provider is mitigating an attack. The status messages are sent to enable the devices to relay information to the other device. When an attack occurs, additional information is added to the status messages to, for example, request mitigation or provide feedback about how much traffic has been dropped in the scrubbing center 116.

Figure 6:
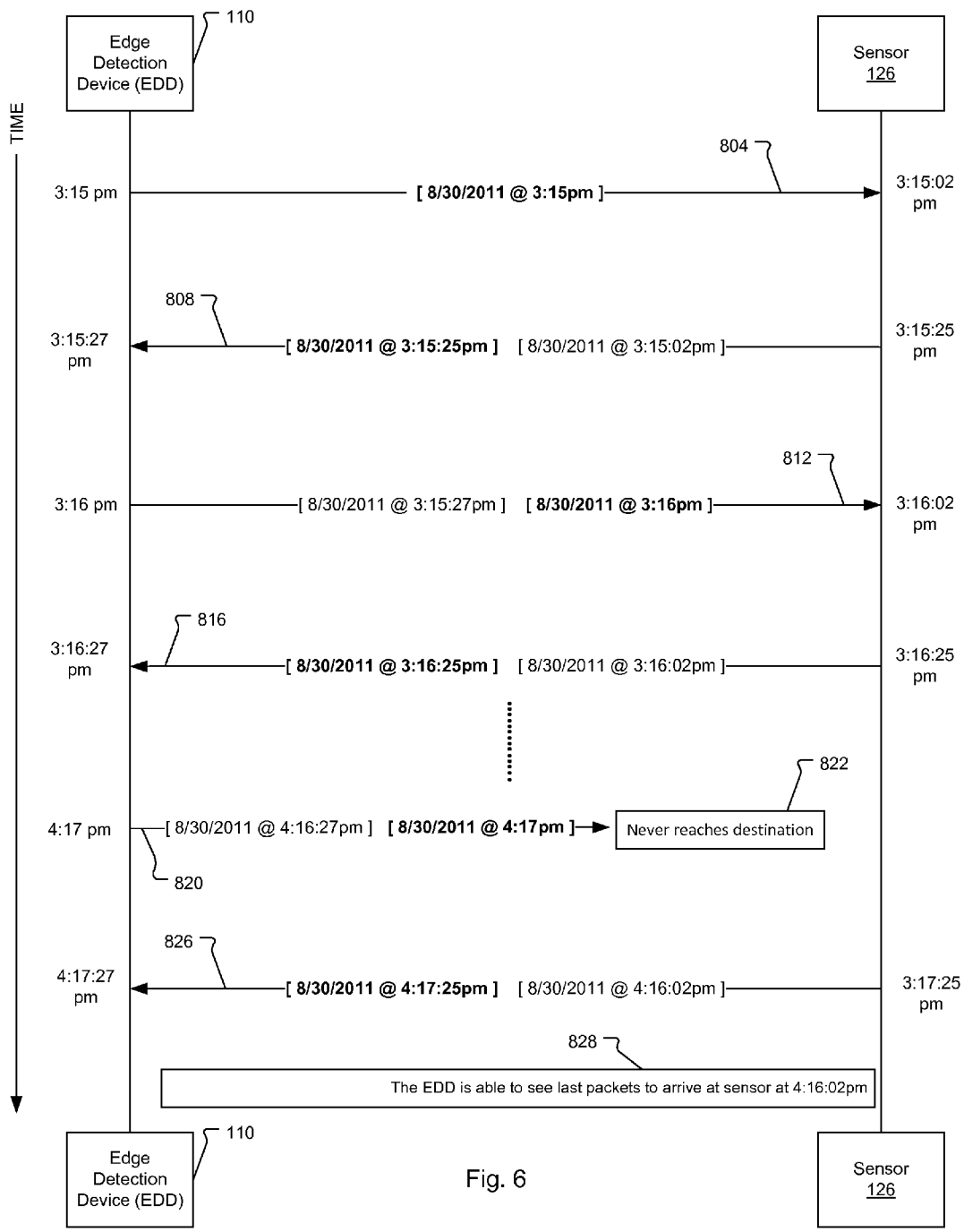
FIG. 6 is a timing diagram illustrating the steps performed by the edge detection device when sending and receiving status messages.

FIG. 6 is a timing sequence that shows how the edge detection device 110 and sensor 126 send status messages to each other. In the preferred embodiment, the status messages are not sent as part of a client/server protocol where one side makes requests and the other side responds. Both devices send status messages every minute regardless of whether a message was received from the other device. In alternative embodiments, a network or website administrator is able to vary the length of time between sending status messages.

The messages are preferably sent using stateless communication protocols such as UDP (User Datagram Protocol) because other messaging protocols, such as TCP, are not congestion-resistant. Using UDP ensures that a failure by one device or by one side of the communication channel does not affect the other.

Additionally, the messages use QoS (quality of service) IP header fields to prioritize status messages over network traffic. Three duplicate packets are sent to increase the chances of the messages/cloud signals arriving during an attack. The number of duplicate packet sent, however, is configurable by a user. Lastly, the packets of the status messages are encrypted such as with AES-128-CBC and authenticated with SHA-1 HMAC for added security.

In the illustrated example, the edge detection device 110 sends status messages (804, 812, 820) every minute. Similarly, the sensor sends out status messages (808, 816, 826) every minute as well. The first status message 804 is sent at 3:15 pm on 8/30/2011 and includes a timestamp of when the message was sent by the edge detection device 110. The sensor 126 records the arrival time (3:15:02 pm on 8/30/2011) of the status message. The sensor 126 then includes the arrival time (3:15:02 pm on 8/30/2011) along with a timestamp of when the status message was sent from the sensor (3:15:25 pm on 8/30/2011) in the status message 808 sent to the edge detection device. The status message 808 is received by the edge detection device 110 and the arrival time (3:15:27 pm on 8/30/2011) is recorded.

Similarly, when the edge detection devices 110 receives a status messages the edge detection device 110 includes the arrival time (3:15:27 pm on 8/30/2011) along with a time-stamp of when the new status message is sent (3:16 pm on 8/30/2011). The arrival time is recorded by the sensor 126 and the arrival time and a timestamp of when the packet is sent is included in the status message 816 that is sent to edge detection device 110. This process of sending and receiving status messages continues between the two devices.

Additionally, the devices continue to send messages regardless of whether the other device continues to receive or send status messages. If a status message never reaches its destination, then the other devices continues to include the arrival time of the most recently received status message. In this way, both devices are able to determine when one side of the communication channel has failed. The one device is able to determine when the communication channel has failed because no more status messages are being received. Likewise, the other device, which is still able to receive status messages, is able to determine that no status messages were received because the arrival time has not been updated.

In the illustrated example, the edge detection device 110 sends a status message 820, but that message never reaches its destination 822. Because the sensor 126 never received a status message from the edge detection device 110, the sensor 126 includes the most recent arrival time with the timestamp of when the status was sent. Thus, when the edge detection device 110 receives the status message 826 and determines that the timestamp for the last received message has not been updated, the edge detection device is able to see that the sensor has stopped receiving status messages 828. Likewise, the edge detection device is able to pinpoint the exact time the last message was received.

Additionally, any packets outside the specified time range are discarded. Likewise, any packet with a duplicate last received time is discarded because it is a duplicate or out of sequence packet. Because time is hard to synchronize among multiple computers, alarm conditions are displayed when communication is considered to be lost because of bad timestamps. For example, if devices have not received any valid messages, but have received some that are outside the window, a system alarm is generated in one implementation indicating time-out synchronization. An alternative to time-stamps would be to use sequence numbers. Timestamps are preferred, however, because they synchronize even if communication between the edge detection device and service provider is broken. And it is expected that communications will be lossy during attacks.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for mitigating an attack on a network utilizing a subscriber monitoring device and a service provider mitigation system, the method comprising:
    the subscriber monitoring device monitoring network traffic between a subscriber network and a service provider network;
    the subscriber monitoring device and service provider mitigation system sending and receiving asynchronous status messages to each other using a stateless protocol;
    the subscriber monitoring device determining if the subscriber network is under attack and determining a fingerprint for the attack, wherein the attack fingerprint comprises at least one of one or more source IP addresses of the packets that make up the attack, one or more destination IP addresses of the packets that make up the attack, characteristics of packet payloads related to the packets that make up the attack and port numbers that are under attack;
    the subscriber monitoring device requesting mitigation from the service provider mitigation system via a mitigation request when the subscriber network is under attack, wherein said mitigation request includes the attack fingerprint;
    the service provider mitigation system providing mitigation, the mitigation including dropping packets generated by attackers based on, at least in part, the attack fingerprint while the subscriber network is under attack, the mitigation being provided in response to the requested mitigation; and
    the subscriber monitoring device sending a request to terminate the mitigation in response to an amount of network traffic dropped by the service provider mitigation system as indicated by status messages from the service provider mitigation system and an amount of network traffic received from the service provider mitigation system following the mitigation, wherein the service provider mitigation system further comprises a plurality of sensors and communication devices providing data communication and transmission of packets across the service provider network, wherein each status message sent between the subscriber monitoring device and the service provider monitoring system includes an arrival time of a most recently received status message and a timestamp of when the respective status message was sent,
    wherein each status message sent between the subscriber monitoring device and the service provider monitoring system includes an arrival time of a most recently received status message and a timestamp of when the respective status message was sent.

2. The method according to claim 1, further comprising determining if the subscriber network is under attack in response to the amount network traffic received by the subscriber network.

3. The method according to claim 1, further comprising determining if the subscriber network is under attack in response to the amount of network traffic between the service provider network and subscriber network exceeding a predefined threshold.

4. The method according to claim 1, wherein the service provider mitigation system comprises packet scrubbing systems, and the method further comprising sending packets destined for the subscriber network first to the packet scrubbing systems.

5. The method according to claim 4, further comprising the packet scrubbing system dropping packets identified as attack traffic.

6. The method according to claim 4, wherein sending the packets destined for the subscriber network to the packet scrubbing system comprises tunneling, route injection, Domain Name System modification, and/or Network Address Translation.

7. The method according to claim 4, wherein sending the packets destined for the subscriber network to the packet scrubbing system comprises sending the packets using Generic Routing Encapsulation or Multiprotocol Label Switching.

8. The method according to claim 1, wherein the status messages include internet protocol addresses of a cloud scrubbing device and the subscriber monitoring device.

9. The method according to claim 1, wherein the status messages include a modified internet protocol address of a device under attack within the subscriber network.

10. The method according to claim 1, wherein the attack is a denial of service attack.

11. The method according to claim 1, wherein the subscriber monitoring device utilizes port mirroring to monitor all the network traffic entering and/or leaving the subscriber network via a router.

12. A system for mitigating an attack on a network, the system comprising:
  a subscriber monitoring device monitoring network traffic between a subscriber network and a service provider network, and determining if the subscriber network is under attack and determining a fingerprint for the attack, wherein the attack fingerprint comprises at least one of one or more source IP addresses of the packets that make up the attack, one or more destination IP addresses of the packets that make up the attack, characteristics of packet payloads related to the packets that make up the attack and port numbers that are under attack;
  a service provider mitigation system, in which the subscriber monitoring device and the service provider mitigation system send and receive asynchronous status messages to each other using a stateless protocol, the service provider mitigation system providing mitigation, the mitigation including dropping packets generated by attackers based on, at least in part, the attack fingerprint while the subscriber network is under attack, the mitigation being in response to a requested mitigation via a mitigation request from the subscriber monitoring system, wherein said mitigation request includes the attack fingerprint and wherein the subscriber monitoring device sends a request to terminate the mitigation in response to an amount of network traffic dropped by the service provider mitigation system as indicated by status messages from the service provider mitigation system and an amount of network traffic received from the service provider mitigation system following the mitigation, wherein the service provider mitigation system further comprises a plurality of sensors and communication devices providing data communication and transmission of packets across the service provider network,
  wherein each status message sent between the subscriber monitoring device and the service provider monitoring system includes an arrival time of a most recently received status message and a timestamp of when the respective status message was sent.

13. The system according to claim 12, wherein the subscriber monitoring device determines if the subscriber network is under attack in response to the amount network traffic received by the subscriber network.

14. The system according to claim 12, wherein the subscriber monitoring device determines if the subscriber network is under attack in response to the amount network traffic between the service provider network and subscriber network exceeding a predefined threshold.

15. The system according to claim 12, further comprising a packet scrubbing system, wherein the packets destined for the subscriber network are first sent to the packet scrubbing systems.

16. The system according to claim 15, wherein the packet scrubbing system drops packets identified as attack traffic.

17. The system according to claim 15, wherein sending the packets destined for the subscriber network to the packet scrubbing system comprises tunneling, route injection, Domain Name System modification, and/or Network Address Translation.

18. The system according to claim 15, further comprising sending packets to the packet scrubbing system using Generic Routing Encapsulation or Multiprotocol Label Switching.

19. The system according to claim 12, wherein the status messages include internet protocol addresses of a cloud scrubbing system and the subscriber monitoring device.

20. The system according to claim 12, wherein the status messages include a modified internet protocol address of a device under attack within the subscriber network.

21. The system according to claim 12, wherein the attack is a denial of service attack.

22. The system according to claim 12, wherein the subscriber monitoring device utilizes port mirroring to monitor all the network traffic entering and/or leaving the subscriber network via a router.

23. A networking system, comprising:
  a subscriber monitoring device monitoring network traffic between a subscriber network and a service provider network, and determining if the subscriber network is under attack and determining a fingerprint for the attack, wherein the attack fingerprint comprises at least one of one or more source IP addresses of the packets that make up the attack, one or more destination IP addresses of the packets that make up the attack, characteristics of packet payloads related to the packets that make up the attack and port numbers that are under attack; and
  a mitigation system, in which the subscriber monitoring device and the service provider mitigation system send and receive asynchronous status messages to each other using a stateless protocol, the mitigation system including a scrubbing system for providing mitigation by dropping packets that are part of a denial of service attack based on, at least in part, the attack fingerprint, wherein the mitigation system, in response to the subscriber monitoring system signaling an attack via a mitigation request that includes the attack fingerprint, directing traffic destined for the subscriber network first to the scrubbing center and then back to the subscriber network, wherein the mitigation system further comprises a plurality of sensors and communication devices providing data communication and transmission of packets across the service provider network, and
  wherein the subscriber monitoring device sends a request to terminate the mitigation in response to an amount of network traffic dropped by the scrubbing system as indicated by status messages from the mitigation system and an amount of network traffic directed from the scrubbing center back to the subscriber network,
  wherein each status message sent between the subscriber monitoring device and the service provider monitoring system includes an arrival time of a most recently received status message and a timestamp of when the respective status message was sent.

24. The system according to claim 23, wherein mitigation system directs traffic to the scrubbing center and back to the subscriber network using tunneling.

25. The system according to claim 23, wherein mitigation system directs traffic to the scrubbing center and back to the subscriber network using route injection.

26. The system according to claim 23, wherein mitigation system directs traffic to the scrubbing center and back to the subscriber network using Domain Name System modification.

27. The system according to claim 23, wherein mitigation system directs traffic to the scrubbing center and back to the subscriber network using Network Address Translation.

28. The system according to claim 23, wherein mitigation system directs traffic to the scrubbing center through an internet service provider network.

29. The system according to claim 23, wherein the subscriber monitoring device utilizes port mirroring to monitor all the network traffic entering and/or leaving the subscriber network via a router.

30. A networking system, comprising:
  a subscriber monitoring device monitoring network traffic between a subscriber network and a service provider network and determining if the subscriber network is under attack and a fingerprint for the attack, wherein the attack fingerprint comprises at least one of one or more source IP addresses of the packets that make up the attack, one or more destination IP addresses of the packets that make up the attack, characteristics of packet payloads related to the packets that make up the attack and port numbers that are under attack; and
  a mitigation system, in which the subscriber monitoring device and the service provider mitigation system send and receive asynchronous status messages to each other using a stateless protocol, the mitigations system including a scrubbing system, for providing mitigation by dropping packets that are part of a denial of service attack based on the fingerprint, wherein the mitigation system further comprises a plurality of sensors and communication devices providing data communication and transmission of packets across the service provider network, and
  wherein the subscriber monitoring device terminates the mitigation in response to a total of an amount of network traffic dropped by the scrubbing system as indicated by status messages from the mitigation system and an amount of network traffic directed from the mitigation system to the subscriber network via the service provider network,
  wherein each status message sent between the subscriber monitoring device and the service provider monitoring system includes an arrival time of a most recently received status message and a timestamp of when the respective status message was sent.

* * * * *